(12) United States Patent
Ikeuchi

(10) Patent No.: US 7,212,845 B2
(45) Date of Patent: May 1, 2007

(54) PORTABLE TERMINAL DEVICE CAPABLE OF DISPLAYING INFORMATION IN A CLOSED STATE

(75) Inventor: Shinji Ikeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 10/290,516

(22) Filed: Nov. 8, 2002

(65) Prior Publication Data
US 2003/0092401 A1    May 15, 2003

(30) Foreign Application Priority Data
Nov. 13, 2001  (JP)  .............. 2001-347168

(51) Int. Cl.
H04B 1/38 (2006.01)
H04M 1/00 (2006.01)
(52) U.S. Cl. ............... 455/575.3; 455/566; 455/575.1; 455/90.3; 379/433.13; 379/433.04; 379/433.07
(58) Field of Classification Search ............. 455/566, 455/575.1, 575.3, 90.3; 379/433.13, 433.04, 379/433.07
See application file for complete search history.

(56) References Cited

U.S. PATENT DOCUMENTS

| 5,196,991 A | 3/1993 | Hsieh |
| 5,636,275 A | 6/1997 | Takagi et al. |
| 5,657,370 A * | 8/1997 | Tsugane et al. ............. 455/566 |
| 6,115,618 A | 9/2000 | Lebby et al. |
| 6,542,721 B2 * | 4/2003 | Boesen .................... 455/553.1 |
| 6,549,789 B1 * | 4/2003 | Kfoury .................... 455/550.1 |

FOREIGN PATENT DOCUMENTS

| DE | 199 50 006 A1 | 4/2001 |
| JP | H6266472 A | 9/1994 |
| JP | H9331387 A | 12/1997 |
| JP | 10-155013 A | 6/1998 |
| JP | 10155013 * | 6/1998 |
| JP | 2000-151781 A | 5/2000 |
| JP | 3075258 U | 11/2000 |
| JP | 20015564 A | 1/2001 |

* cited by examiner

Primary Examiner—Matthew D. Anderson
Assistant Examiner—Yuwen Pan
(74) Attorney, Agent, or Firm—Sughrue Mion, PLLC

(57) ABSTRACT

A folding mobile telephone having an upper terminal body and a lower terminal body is provided. The upper terminal body has an upper part with a liquid crystal display and a base, such that the upper part and the base are connected to each other via lock mechanism. This lock mechanism permits the upper part and the base to be mounted and removed in a flipping manner. The upper terminal body also has communications devices to make electrical connections. The upper terminal body has an operating mechanism that allows prescribed operations to be performed using the upper terminal body when it is connected to its base and folded against the lower terminal body (i.e., the closed state).

30 Claims, 6 Drawing Sheets

PORTABLE TERMINAL DEVICE CAPABLE OF DISPLAYING INFORMATION IN A CLOSED STATE

BACKGROUND OF THE INVENTION

1. Field of the Invention

The present invention relates to a mobile terminal device having an upper terminal body and a lower terminal body, which are connected via a hinge so as to allow the mobile terminal device to be opened and closed.

2. Description of the Related Art

Mobile telephones include integral mobile telephones and folding mobile telephones. In particular, folding mobile telephones are superior in portability because the mobile telephones are compact in a closed state (folded state).

However, liquid crystal displays provided on the folding mobile telephones are generally placed on the inner surfaces of the upper and lower terminal bodies of the folding mobile telephones in such a manner to be viewed in an opening state. Namely, in the closed state, the liquid crystal displays cannot be viewed.

The inability to view the liquid crystal displays when only the telephone function is used in not inconvenient. However, in the present day, various functions, such as e-mail access and Internet access, have been added to mobile telephones. When a received e-mail is read, or when various sites are viewed by accessing Internet, folding mobile telephones need to be opened every time to expose the liquid crystal displays, which is considerably troublesome. Additionally, in some cases, an e-mail message needs to be read in a crowded place. Thus, the opening operation is quite troublesome in a limited free space.

The above-described problem can be solved by placing the liquid crystal displays on the outer and inner surfaces of the upper and lower terminal bodies of the folding mobile telephone. However, it is quite uneconomical to have more liquid crystal displays. In addition, the thickness in the structure of the folding mobile telephone is increased, thereby contradicting a compact size, which is an advantage of folding mobile telephones.

Thus, in view of the above-described problem, Japanese Utility Model Registration No. 3075258 discloses a folding mobile telephone with a flipped display. Further, in Japanese Laid-Open Patent Application Heisei 10-155013 and Japanese Laid-Open Patent Application 2000-151781 (division of Japanese Laid-Open Patent Application Heisei 10-155013), the applicant of the present invention has proposed portable communication apparatuses which can change fixed forms of folding mobile telephones according to preference and use, though the publications are not devised to solve the above-described problem.

In the folding mobile telephone with a flipped display that is disclosed in Japanese Utility Model Registration No. 3075258, a receiver-side case having a liquid crystal display and a transmitter-side case are connected so as to be flipped by 180 degrees around a hinge, and the liquid crystal display is exposed in a closed state if necessary.

Moreover, in the portable communication apparatus disclosed in Japanese Laid-Open Patent Application Heisei 10-155013, one or more kinds of connectors including a bending type, a rotating type, and a straight line type are prepared for electrically and structurally connecting an upper case and a lower case, and the connectors are properly selected according to use and preference to connect the upper case and the lower case via the connectors. Besides, in the portable communication apparatus disclosed in Japanese Laid-Open Patent Application 2000-151781, cases with forms suitable for use are arbitrarily selected, and an upper case and a lower case are connected via a connector for making electrical and structural connection.

However, as to the folding mobile telephone with a flipped display that is disclosed in Japanese Utility Model Registration No. 3075258, although the structure of the rotating part is not discussed in detail, it is suggested that the compact size is not achieved due to a rotating part as long as the receiver-side case having the liquid crystal display is flipped by 180 degrees. In addition, it is considered that a prescribed locking mechanism is necessary for preventing the receiver-side case from rotating when a telephone function is used (the case is likely to rotate because the receiver is pressed to an ear), resulting in a more complicated mechanical structure.

Moreover, the portable communication apparatuses disclosed in Japanese Laid-Open Patent Application Heisei 10-155013 and Japanese Laid-Open Patent Application 2000-151781 do not present a technical idea for viewing a liquid crystal display in the closed state.

SUMMARY OF THE INVENTION

The present invention has been accomplished to solve the above-described problems experienced by the related art. Thus, an aspect of the present invention is to provide a portable terminal device whereby a liquid crystal display for viewing e-mail messages, Internet sites, and other information in a closed state with a simple configuration without losing a compact design.

A second aspect of the present invention is to provide a portable terminal device in which electrical connection is ensured even when an upper terminal body is separated from a lower terminal body. The second aspect also allows predetermined operations to be performed from the separated upper terminal body, so that portability can be further improved when viewing e-mail messages, Internet sites, and other information.

To solve the above mentioned problem, a portable terminal device comprises a first case unit comprising first key buttons, a second case unit connected to the first case unit via a hinge so as to be opened and closed, a third case unit comprising a display, a connecting means for connecting the second case unit to the third case unit and a lock means for mounting and removing the third case unit from the second case unit. The connecting means electrically connects the second case unit to the third case unit to communicate each other. The lock means mounts the third case unit on the second case unit in a flipping manner. The third case unit may comprise second key buttons. The second key buttons is disposed on the same side as the display. Both the display and the second key buttons are preferably provided on an outer surface of the third case unit when the third case unit is connected to the second case unit. The lock means is a snap-in lock mechanism included in the second case nit and the third case unit. The portable terminal device is preferably a portable telephone. The lock means may be an interlocking mechanism provided in the second case unit and the third case unit. The interlocking mechanism comprises an engaged part provided in a first connecting surface of the second case unit and an engaging part which is provided in a second connecting surface of the third case unit and is removably engaged with the engaged part. The engaging part is configured such that the engaging part engaged to the engaged part is disengaged in response to a predetermined operation by an user, so that the second case unit and the third case unit are separated from each other. The portable terminal device is preferably a portable telephone. The connecting means is a pair of male and female connectors for making wired connection between the second case unit and the third case unit. The portable terminal device is preferably a portable telephone. The connecting means may be a radio part which is provided both on the second case unit and the third case unit so as to perform transmission and reception and makes wireless connection between the second case unit and the third case unit. The portable terminal device is preferably a portable telephone.

With the above-described configurations, the present invention has advantages discussed below.

According to the present invention, an upper terminal body comprises an upper part having a liquid crystal display and a base. The upper part and the base are connected to each other via lock means, which permits the upper part and the base to be mounted and removed in a flipping manner. There is provided communication means for making electrical connections, even when the upper part is connected to the base so as to expose the liquid crystal display on an outer surface in a closed state. There is also provided operating means for performing prescribed operations is provided on an outer surface of the upper part. Hence, even in the closed state, e-mail and various sites can be viewed while being freely operated.

Further, since the electrical connections are made by a radio system, the mobile telephone can be used in a state in which the upper part is separated from the base. E-mail messages can be read and a desired site can be viewed by accessing the Internet only by using the small and lightweight upper part while a lower terminal body is put in a bag or under the table, thereby providing a mobile telephone which is quite excellent in portability.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENTS

Hereinafter, each embodiment of the present invention will be described in detail with reference to the drawings. FIGS. 1 to 4 describe a first embodiment of the present invention and FIGS. 5 to 8 describe a second embodiment of the present invention.

Figure 1:
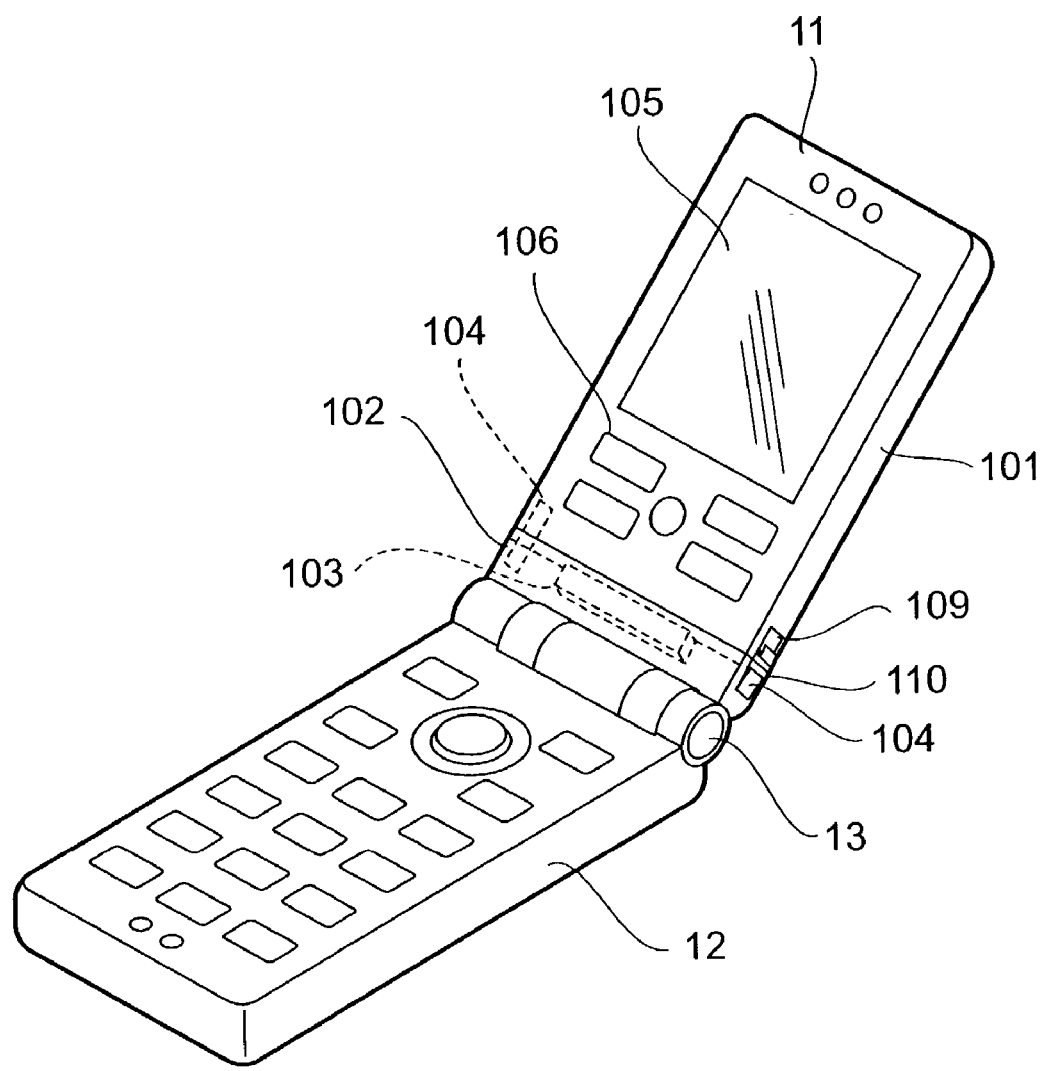
FIG. 1 is a perspective view showing a state in which a mobile telephone of the present invention is opened.

FIG. 1 is a perspective view showing a state in which a mobile telephone of the present invention is opened. As shown in FIG. 1, in a portable terminal device, i.e., a mobile telephone of the first embodiment, an upper terminal body 11 and a lower terminal body 12 are provided. The upper terminal body 11 and the lower terminal body 12 have operating buttons for inputting telephone numbers, text, etc. on their inner surfaces. The upper terminal body 11 and the lower terminal body are connected via a hinge 13 so as to be opened and closed. The electronic circuits (not shown) required for mobile telephone functions, e-mail functions, and Internet functions are internally packaged. Hereinafter, the upper terminal body 11 serving as a major part of the present invention will be discussed in detail.

The upper terminal body 11 comprises an upper terminal body upper part 101 (hereinafter, simply referred to as an "upper part" in the present embodiment), an upper terminal body base 102 (hereinafter, simply referred to as a "base" in the present embodiment), a connector 103 (communication means), and lock means 104.

In the upper part 101, a liquid crystal display 105 is provided for displaying telephone numbers, addresses, text and images from e-mail messages and the Internet. A button group 106 (operating means) for realizing simple operations other than the telephone function and the operation of writing e-mail is provided under the liquid crystal display 105. The bottom group 106 comprises a screen scrolling button and an enter button for viewing e-mail and Internet.

The base 102 constitutes the hinge 13 with the upper part of the lower terminal body 12 and is connected to the lower terminal body 12 so as to be opened and closed.

Figure 2:
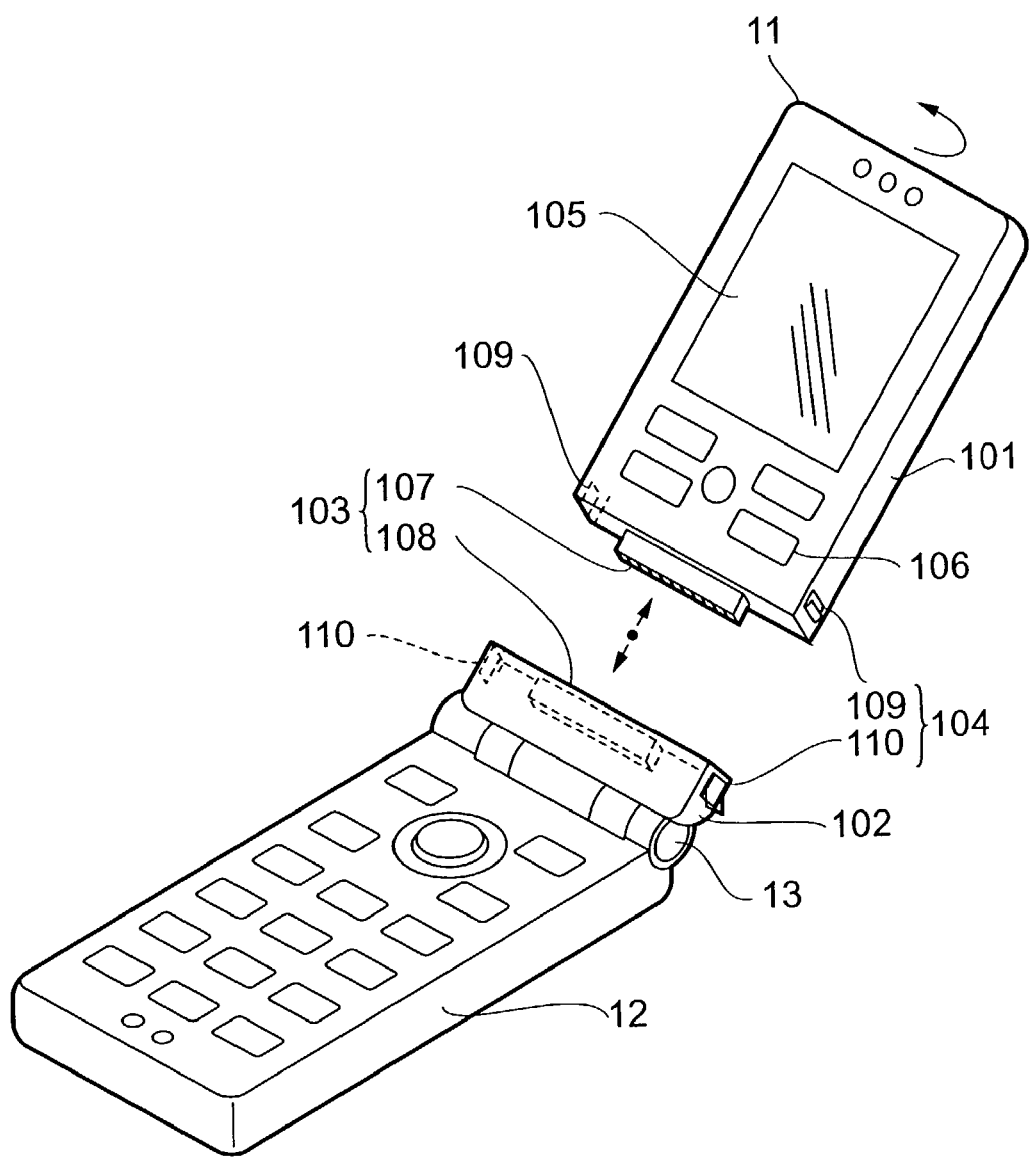
FIG. 2 is an exploded perspective view showing the mobile telephone.

FIG. 2 is an exploded perspective view showing the mobile telephone. As shown in FIG. 2, the connector 103 comprises a male connector 107, which is connected to electronic circuits packaged inside the upper part 101 and protrudes on the lower surface (connecting surface with the base) of the upper part 101. The connector 103 further comprises a female connector 108, which is connected via the hinge 13 to electronic circuits packaged inside the lower terminal part 12 and can be detachably fit onto the male connector 107 in the top face (connecting surface with the upper part) of the base 102. The male connector 107 and the female connector 108 are engaged to each other to electrically connect the upper part 101 and the base 102.

For the male connector 107 and the female connector 108, contact pins are arranged in the connector so as to have normal electric connection even when the upper part 101 is flipped in such a manner as to place the liquid crystal display 105 on the back.

The lock means 104 is a snap-in lock mechanism provided on both sides of the upper part 101 and both sides of the base 102. The lock means 104 comprises engaged parts 109 provided both sides of the upper part 101 and latches 110 provided on both sides of the base 102. The lock means 104 is a hook type having a structure for lifting and disengaging the latches of the base 102.

Figure 3:
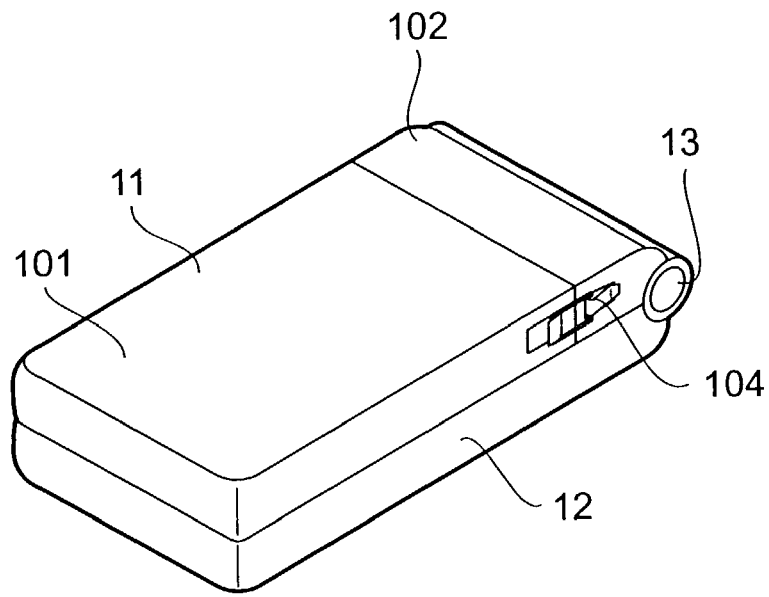
FIG. 3 is a perspective view showing a state in which the mobile telephone is folded such that a liquid crystal display cannot be viewed.

As shown in FIG. 1, when an ordinary telephone function is used and e-mail is written, the mobile telephone of the first embodiment is used in a state in which the upper part 101 is fit into the base 102 via the connector 103 and the snap-in lock mechanism 104 so as to position the liquid crystal display 105 such that it be viewed. FIG. 3 is a perspective view showing a state in which the mobile telephone is folded with a liquid crystal display being placed such that it cannot be viewed. When the mobile telephone is folded in this state, as shown in FIG. 3, the appearance is identical to that of a conventional folding mobile telephone without exposing the liquid crystal display 105.

Figure 4:
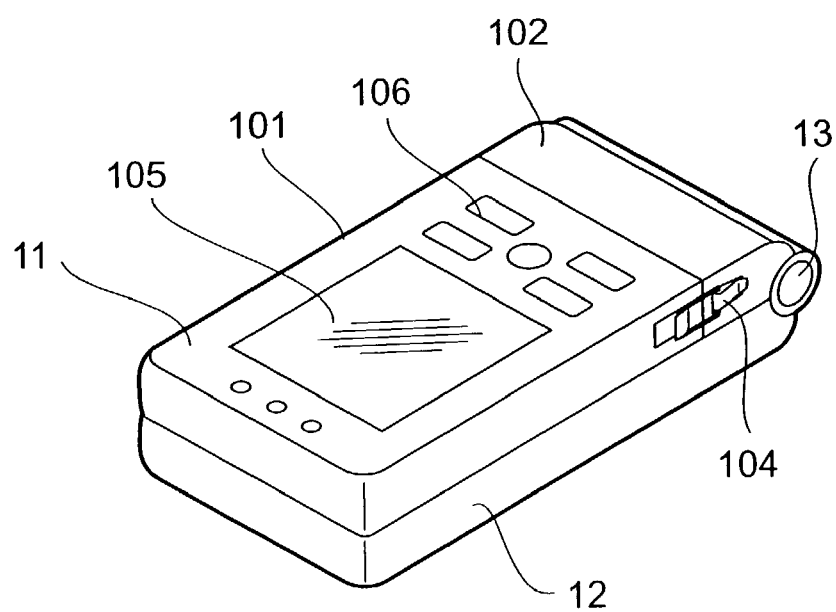
FIG. 4 is a perspective view showing a state in which the mobile telephone is folded such that a liquid crystal display can be viewed.

When the user desires to read e-mail or access Internet sites, as shown in FIG. 2, the latches provided on both sides of the base 102 are lifted and disengaged from the engaged parts 109. The upper part 101 is removed upward, so that the upper part 101 is separated from the base 102. And then, the upper part 101 is flipped so as to place the liquid crystal display 105 can be viewed, and the upper part 101 is fit into the base 102 via the connector 103 and the snap-in lock mechanism 104 and is folded. This state is shown in FIG. 4 that is a perspective view showing a state in which the mobile telephone is folded with a liquid crystal display being placed so that it can be viewed. With this configuration, the liquid crystal display 105 can be viewed from the outside, the operating button group 106 (operating means) is exposed on the outer surface of the upper part 101, and e-mail messages and Internet sites can be viewed while the mobile telephone is in the closed state.

Referring to FIGS. 5–8, the second embodiment will be discussed below. This second embodiment is an example in which an interlocking mechanism is used as lock means and a radio system is used as communication means.

Figure 5:
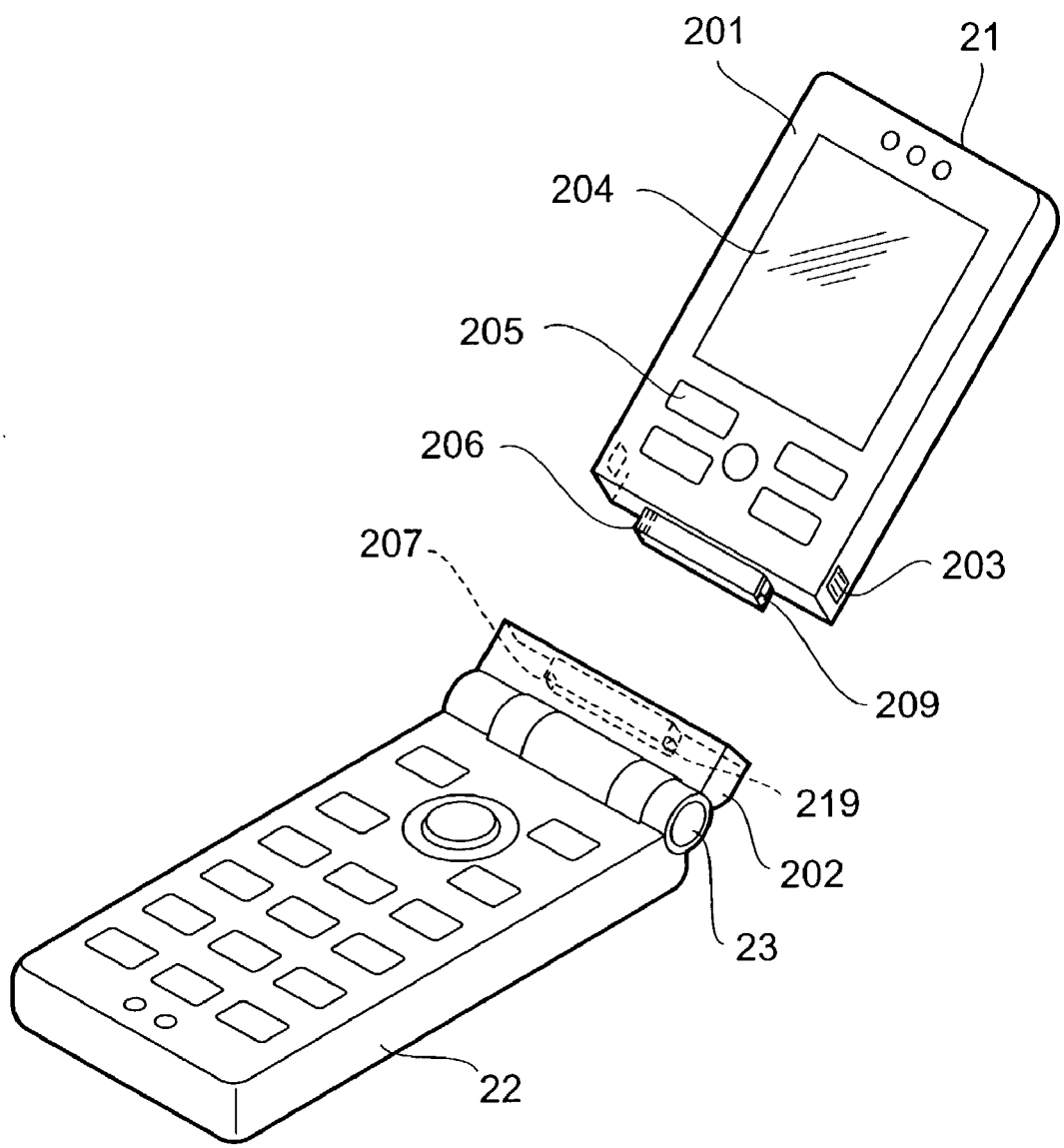
FIG. 5 is a perspective view showing a state in which a mobile telephone of the present invention is opened.

FIG. 5 is a perspective view showing a state in which a mobile telephone of the present invention is opened. As shown in FIG. 5, an upper terminal body comprises an upper part 201, a base 202, a radio section (communication means: not shown), and lock means 203.

In the upper part 201, a liquid crystal display 204 is provided for displaying telephone numbers, addresses, text and images from e-mail messages and the Internet. A button group 205 (operating means) for realizing simple operations other than telephone functions and writing e-mail is provided under the liquid crystal display 204. The bottom group 205 includes a screen scrolling button and an enter button for viewing e-mail and Internet.

The base 202 constitutes a hinge 23 with the upper part of a lower terminal body 22 and is connected to the lower terminal body 22 so as to be opened and closed.

The lock means 203 is an interlocking mechanism provided on the upper part 201 and the base 202 and comprises an engaging part 206 and an engaged part 207.

Figure 6:
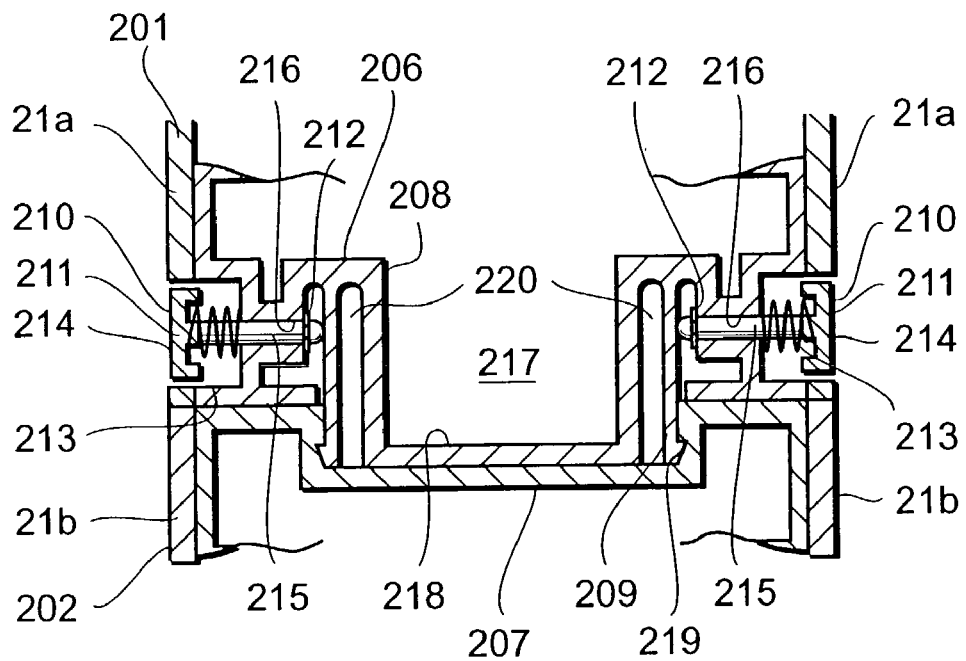
FIG. 6 is an enlarged longitudinal sectional view showing a connecting part when an upper part and a base of the mobile telephone are engaged to each other.

FIG. 6 is an enlarged longitudinal sectional view showing a connecting part when an upper part and a base of the mobile telephone are engaged to each other. As shown in FIG. 6, the engaging part 206 comprises an inner housing 208, which is fixed in the lower part of an upper case 21a and has claws 209, pressing parts 210 for causing the claws 209 to project and retreat.

The inner housing 208 is substantially formed into a convex part which is fixed in the lower part of the upper case 21a so as to protrude substantially as a rectangle solid from the center of the lower surface of the upper part 201 (connecting surface with the base). The claws 209 are vertically disposed so as to protrude on both side faces of a short side of a protruding part 217 from the upper part of grooves 220. The grooves 220 are concavely disposed in a vertical direction at the center of the side faces of the short side of the protruding part 217. The claws 209 are elastically deformed by a pressing operation of pressing parts 210, which will be discussed later, and can be protruded and retreated from the side faces.

The pressing parts 210 each comprises a pressing body 211, a snap ring 212 and a compression spring 213. The pressing bodies 211 are substantially formed into convex parts, each having a stick-like core beam 215 extended from an operating part 214, which is substantially formed into a rectangular solid. Grooves where the snap rings 212 are fit are each disposed at a prescribed position with a prescribed length, such that the operating parts 214 are flush with outer surfaces in a state in which the ends of the core beams 215 are in contact with the bases of the claws 209, and the core beams 215 are inserted to connecting holes 216 so as to freely slide. The connecting holes 216 are disposed on the lower part of both sides of the inner housing 208 and connect the bases of the claws 209 and the outside.

The snap rings 212 are snap rings for shafts that include an E ring and a C ring, and the snap rings 212 are fit into the grooves formed around the pressing bodies 211 to prevent the pressing bodies 211 from falling.

The compression springs 213 are loosely fit into the bases of the core beams 215 so as to press the lower part of both sides of the inner housing 208 and the operating part 214, and the compression springs 213 energize the operating parts 214 to the outside.

In the pressing parts 210, when the operating parts 214 are pressed down, the ends of the core beams 215 press the bases of the claws 209 to elastically deform the claws 209 protruding on the sides of the protruding part, and the claws 209 are stored in the grooves 220. When the press of the operating parts 214 is removed, the pressing bodies 211 are returned to prescribed positions by the compression springs 213 and the claws 209 simultaneously return to a state in which the claws 209 protrude on both sides, that is, their initial state.

The engaged part 207 has a concave part 218, which is removably engaged to the protruding part 217 of the inner housing 208. The lower part of the concave part 218 is substantially formed into a concave part where a step 219 is concavely disposed for engaging the claws 209, and the engaged part 207 is fixed in the upper part of a base case 21b.

In the radio part (communication means), an electric circuit (not shown) for realizing known communication protocols (e.g., infrared communication and BLUETOOTH communication) is provided so as to have two-way communication between the upper terminal body 21 and the lower terminal body 22. Even when the upper terminal body 21 is separated from the lower terminal body 22, it is possible to access e-mail messages, the Internet and information on the liquid crystal display 204.

When an ordinary telephone function is used and e-mail messages are written, the mobile telephone of the second embodiment configured similar to the first embodiment. That is, the upper part 201 is fit into the base 202 via the interlocking mechanism 203 such that the liquid crystal display 204 is positioned such that if the folding mobile telephone is closed, the liquid crystal display would not be viewable.

Figure 7:
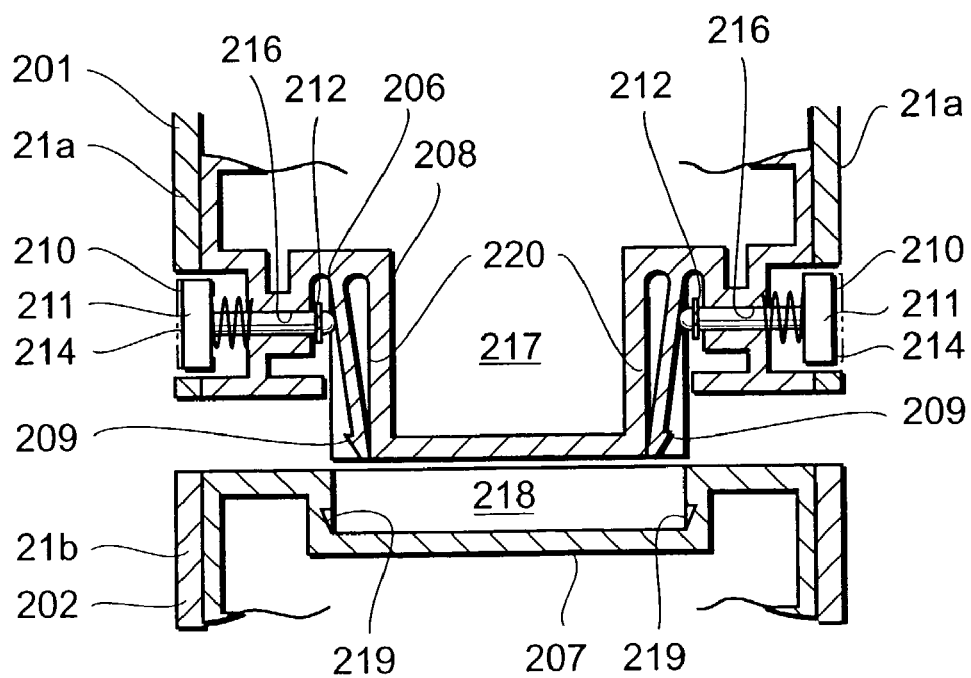
FIG. 7 is an enlarged longitudinal sectional view showing a state in which the upper part and the base of the mobile telephone are separated from each other subsequently to FIG. 6.

FIG. 7 is an enlarged longitudinal sectional view showing a state in which the upper part and the base of the mobile telephone are separated from each other subsequently to FIG. 6. As shown in FIG. 7, the operating parts 214 are pressed down, so that the ends of the core beams 215 press the bases of the claws 209 to elastically deform the claws 209 protruding on the sides of the protruding part 217, the claws 209 are stored in the grooves 211, and the engagement is released. In this state, the upper part 201 is removed upward, so that the upper part 201 is separated from the base 202.

And then, after the upper part 201 is flipped so as to place the liquid crystal display 204 on the back, the upper part 201 is pressed to the base 202. Thus, the claws 209 are brought into contact with the inner wall of the concave part 218 and are bent so as to be stored in the grooves 211, and the upper part 201 is pressed as it is until the claws 209 reach steps 219. When the claws 209 reach the steps 219, the claws 209 are engaged to the steps 219 and the upper part 201 is locked into the base 202. In this way, the liquid crystal display 204 can be viewed from the outside and the operating button group 205 (operating means) is exposed on the outer surface of the upper part 201. Thus, e-mail messages and Internet sites can be viewed while the mobile telephone is in the closed state.

Figure 8:
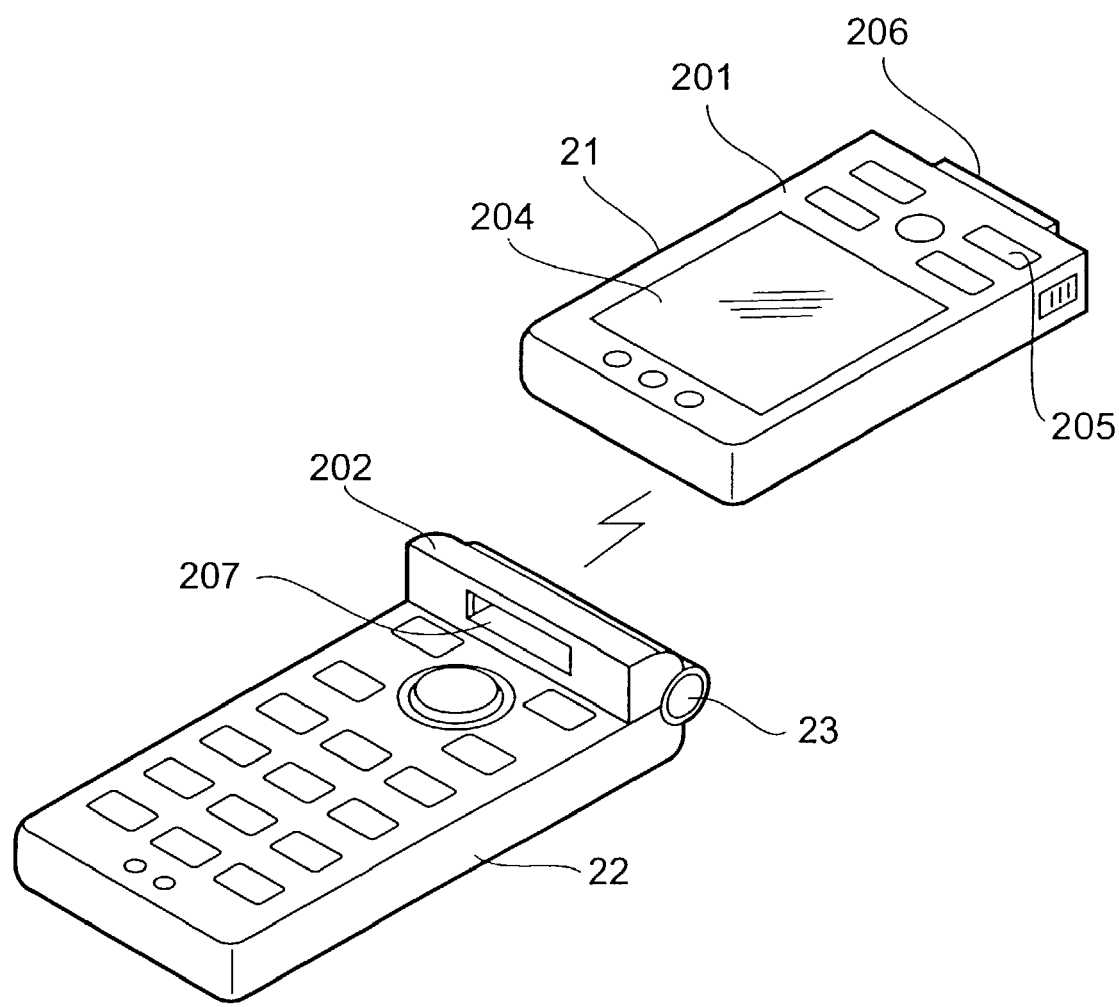
FIG. 8 is a perspective view schematically showing that radio communication is performed while the upper part and the base of the mobile telephone are separated from each other.

FIG. 8 is a perspective view schematically showing that radio communication is performed while the upper part and the base of the mobile telephone are separated from each other. As shown in FIG. 8, since the mobile telephone of the second embodiment uses a radio system as communication means, the mobile telephone can be used while the upper part 201 is separated from the base 202. E-mail messages can be read or desired Internet sites can be viewed by using the small and lightweight upper part while the lower terminal body 22 is placed a short distance away, e.g., in a bag or under the table. This provides a mobile telephone which is quite excellent in portability.

The above explanation discussed the detail of the mobile telephones according to the present embodiments. The present invention is not limited to the present embodiments. Wired connection may be arbitrarily made by using both of the interlocking mechanism and the connector, wireless connection may be arbitrarily made by concavely providing the snap-in locking mechanism not protruding the outer surfaces of the upper part and the base, or another lock means may be arbitrarily used.

Besides, although the mechanical button group provided under the liquid crystal display is discussed as an example of operating means, any form is acceptable including a mechanical button group provided on the side of the upper part and a so-called touch panel on which a switch is integrated with a liquid crystal panel.

Obviously, numerous additional modifications and variations of the present invention are possible in light of the above teachings. It is, therefore, to be understood that within the scope of the appended claims, the invention may be practiced otherwise than as specifically described herein.

What is claimed is:
1. A portable terminal device, comprising:
a first case unit;
a second case unit connected to said first case unit via a hinge;
a detachable case unit comprising a display;
a connecting means for connecting said second case unit to said detachable case unit whereby said second case unit is capable of being connected to said detachable case unit in a first configuration where said display is viewable when said portable terminal device is folded and in a second configuration where said display is not viewable when said terminal device is fold; and
a lock means for mounting said detachable case unit to and removing said detachable case unit from said second case unit in said first and second configurations.

2. The portable terminal device as claimed in claim 1, wherein said connecting means electrically connects said second case unit to said detachable case unit.

3. The portable terminal device as claimed in claim 2, wherein said connecting means comprises at least one electrical connector for making electrical connections between said second case unit and said detachable case unit.

4. The portable terminal device as claimed in claim 3, wherein said portable terminal device is a portable telephone.

5. The portable terminal device as claimed in claim 1, wherein said first case unit comprises a first group of key buttons and said detachable case unit comprises a second group of key buttons.

6. The portable terminal device as claimed in claim 5, wherein said second group of key buttons is disposed on the same side of said detachable case unit as said display.

7. The portable terminal device as claimed in claim 6, wherein both said display and said second group of key buttons are accessible when said detachable case unit is connected to said second case unit.

8. The portable terminal device as claimed in claim 7, wherein said lock means is a snap-in lock mechanism included in said second case unit and said detachable case unit.

9. The portable terminal device as claimed in claim 8, wherein said portable terminal device is a portable telephone.

10. The portable terminal device as claimed in claim 7, wherein said lock means is an interlocking mechanism provided in said second case unit and said detachable case unit.

11. The portable terminal device as claimed in claim 10, wherein said interlocking mechanism comprises: an engaged part provided in a first connecting surface of said second case unit; and an engaging part which is provided in a second connecting surface of said detachable case unit and is removably engaged with said engaged part.

12. The portable terminal device as claimed in claim 11, wherein said engaging part is configured such that said engaging part engaged to said engaged part is disengaged in response to a predetermined operation by an user, so that said second case unit and said detachable case unit are separated from each other.

13. The portable terminal device as claimed in claim 12, wherein said portable terminal device is a portable telephone.

14. The portable terminal device as claimed in claim 1, wherein said second case unit and said detachable case unit comprise a radio part that makes a connection between said first case unit and said detachable case unit through a radio communication.

15. The portable terminal device as claimed in claim 14, wherein said portable terminal device is a portable telephone.

16. The portable terminal device as claimed in claim 1, wherein said second case unit and said detachable case unit comprises an infrared part that makes a connection between said first case unit and said detachable case unit though an infrared communication.

17. The portable terminal device as claimed in claim 16, wherein said portable terminal device is a portable telephone.

18. The portable terminal device as claimed in claim 1, wherein said detachable case unit is selectively mounted to said second case unit in a configuration where said display outwardly faces and in a configuration where said display inwardly faces.

19. The portable terminal device as claimed in claim 1, wherein said display abuts an inner surface of said first case unit when said portable terminal device is folded.

20. The portable terminal device as claimed in claim 1, wherein said lock means mounts said detachable case unit on said second case unit so as not to expose said display on an outer surface of said portable terminal device when said portable terminal device is folded.

21. The portable terminal device as claimed in claim 1, wherein said lock means mounts said detachable case unit on said second case unit so as to expose said display on an outer surface of said portable terminal device when said portable terminal device is folded.

22. The portable terminal device as claimed in claim 1, wherein said connecting means connects said second case unit to said detachable case unit in a plurality of configurations, said plurality of configurations differing in a rotational position of said detachable case unit relative to said second case unit.

23. The portable terminal device as claimed in claim 1, wherein said connecting means comprises a first electrical connector attached to said second case unit and a second electrical connector attached to said detachable case unit, said first and second electrical connectors maintaining a first electrical connection between said second case unit and said detachable case unit in said first mounting configuration, and maintaining a second electrical connection between said second case unit and said detachable case unit in said second mounting configuration, in which said first electrical connector is flipped relative to said second electrical connector in said second mounting configuration.

24. A portable terminal device, comprising:
   a first case unit;
   a second case unit connected to said first case unit via a hinge;
   a detachable case unit comprising a display;
   a connector that connects said second case unit to said detachable case unit whereby said second case unit is capable of being connected to said detachable case unit in a first configuration where said display is viewable when said portable terminal device is folded and in a second configuration where said display is not viewable when said terminal device is fold; and
   a lock mechanism that mounts said detachable case unit to and removes said detachable case unit from said second case unit in said first and second configurations.

25. The portable terminal device as claimed in claim 24, wherein said detachable case unit is selectively mounted to said second case unit in a configuration where said display outwardly faces and in a configuration where said display inwardly faces.

26. The portable terminal device as claimed in claim 24, wherein said display abuts an inner surface of said first case unit when said portable terminal device is folded.

27. The portable terminal device as claimed in claim 24, wherein said lock mechanism mounts said detachable case unit on said second case unit so as not to expose said display on an outer surface of said portable terminal device when said portable terminal device is folded.

28. The portable terminal device as claimed in claim 24, wherein said lock mechanism mounts said detachable case unit on said second case unit so as to expose said display on an outer surface of said portable terminal device when said portable terminal device is folded.

29. The portable terminal device as claimed in claim 24, wherein said connector connects said second case unit to said detachable case unit in a plurality of configurations, said plurality of configurations differing in a rotational position of said detachable case unit relative to said second case unit.

30. The portable terminal device as claimed in claim 24, wherein said connector comprises a first electrical connector attached to said second case unit and a second electrical connector attached to said detachable case unit, said first and second electrical connectors maintaining a first electrical connection between said second case unit and said detachable case unit in said first mounting configuration, and maintaining a second electrical connection between said second case unit and said detachable case unit in said second mounting configuration, in which said first electrical connector is flipped relative to said second electrical connector in said second mounting configuration.

* * * * *